US007124941B1

(12) United States Patent
O'Connell

(10) Patent No.: US 7,124,941 B1
(45) Date of Patent: Oct. 24, 2006

(54) METHOD AND PROGRAM FOR REDUCTION OF RETAIL SALES REVENUE LIMITATIONS

(75) Inventor: Gregory O'Connell, Plano, TX (US)

(73) Assignee: Shrink Solutions, Inc., Plano, TX (US)

( * ) Notice: Subject to any disclaimer, the term of this patent is extended or adjusted under 35 U.S.C. 154(b) by 63 days.

(21) Appl. No.: 10/614,488

(22) Filed: Jul. 7, 2003

(51) Int. Cl.
G06F 19/00 (2006.01)

(52) U.S. Cl. ........................ 235/385; 235/383; 235/375

(58) Field of Classification Search ................ 235/375, 235/376, 383–385, 381; 705/22, 28, 30
See application file for complete search history.

(56) References Cited

U.S. PATENT DOCUMENTS

| | | | |
|---|---|---|---|
| 4,887,208 A | 12/1989 | Schneider et al. | |
| 5,334,822 A | 8/1994 | Sanford | |
| 5,638,519 A | 6/1997 | Haluska | |
| 5,873,070 A | 2/1999 | Bunte et al. | |
| 5,878,416 A * | 3/1999 | Harris et al. ................ | 707/10 |
| 5,893,904 A | 4/1999 | Harris et al. | |
| 6,085,914 A * | 7/2000 | Tobaccowala et al. ...... | 209/702 |
| 6,149,062 A | 11/2000 | Danielson et al. | |
| 6,164,537 A | 12/2000 | Mariani et al. | |
| 6,249,774 B1 | 6/2001 | Roden et al. | |
| 6,536,659 B1 * | 3/2003 | Hauser et al. ............... | 235/375 |
| 6,546,303 B1 * | 4/2003 | Fried et al. .................. | 700/106 |
| 6,556,976 B1 * | 4/2003 | Callen .......................... | 705/37 |
| 2001/0011222 A1 | 8/2001 | McLauchlin et al. | |
| 2001/0037275 A1 * | 11/2001 | Johnson et al. ............... | 705/36 |
| 2001/0046862 A1 | 11/2001 | Coppinger et al. | |
| 2001/0051905 A1 | 12/2001 | Lucas | |
| 2002/0038267 A1 | 3/2002 | Can et al. | |
| 2002/0091593 A1 | 7/2002 | Fowler | |
| 2002/0107753 A1 * | 8/2002 | Laughlin et al. ............... | 705/26 |
| 2002/0116281 A1 * | 8/2002 | Costello et al. ............... | 705/26 |
| 2003/0233246 A1 * | 12/2003 | Snapp et al. .................... | 705/1 |
| 2004/0138969 A1 * | 7/2004 | Goldsmith et al. ........... | 705/30 |

OTHER PUBLICATIONS

"Wal-Mart takes on Web bar codes," www.msnbc.com/news/901016.asp (Apr. 16, 2003).

* cited by examiner

*Primary Examiner*—Ahshik Kim
(74) *Attorney, Agent, or Firm*—Hemingway & Hansen, LLP; D. Scott Hemingway; Malcolm W. Pipes

(57) ABSTRACT

A computer database stores information on inventory product items and associated disposition instructions for unsold product. A field representative at a retail store location processes product items for disposition according to the disposition instructions maintained on the master database. Disposition instructions include destroy, donate, or special handling instructions. The field representative processes unsold product items using a data collection device that includes a data input interface and a communication interface to update the database and track unsold product items remaining in inventory. The database is updated using the input product item, and disposition instructions stored on the master database are displayed on the data collection device for implementation for each scanned product item. At the end of the visit, a credit memo is provided to the retail store for translation into a cash credit or check.

20 Claims, 7 Drawing Sheets

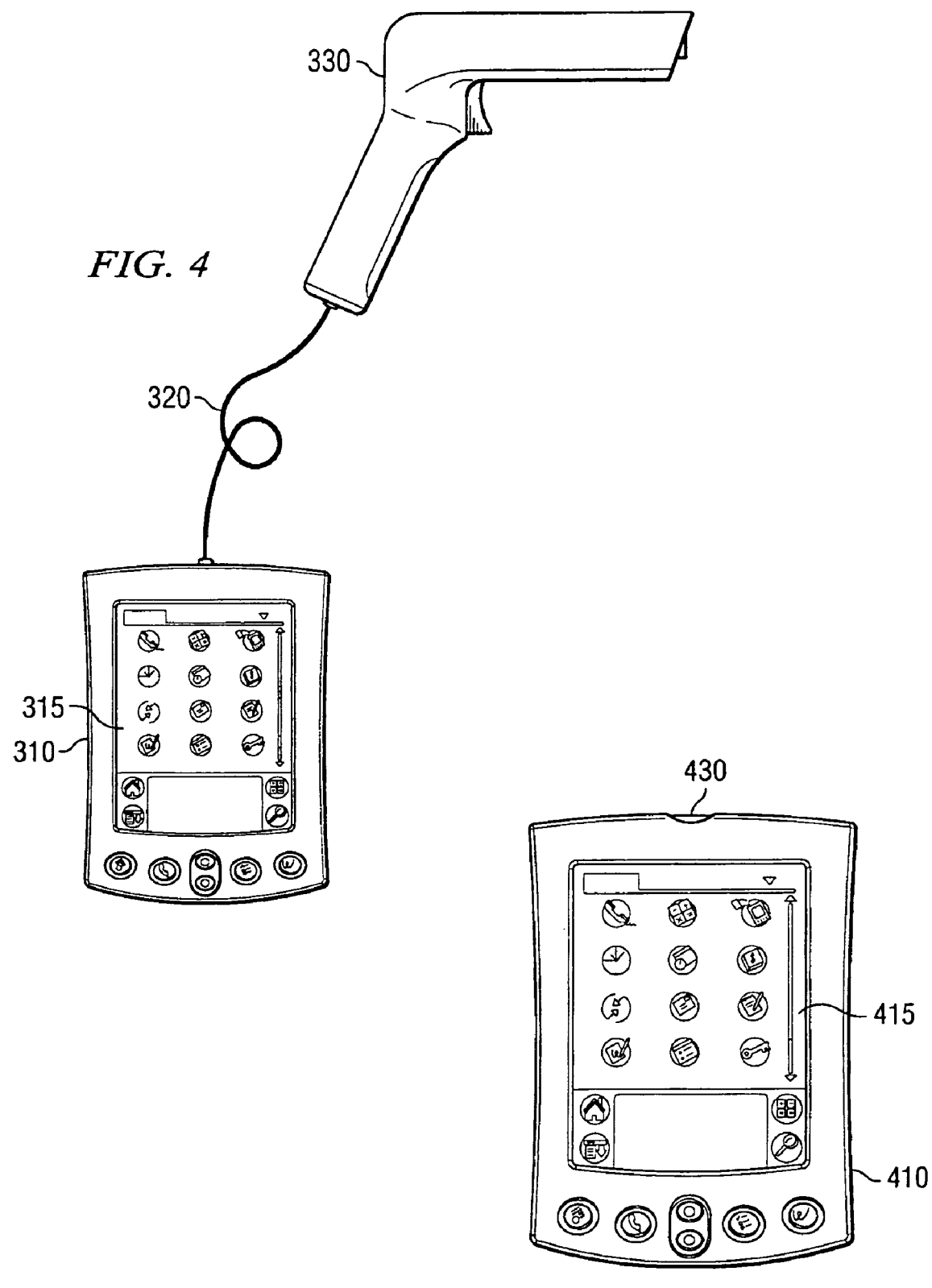

| Store # | |
|---|---|
| Name | |

| | Current Mode: Damage<br>ID<br>UPC<br>Description<br>Return Mode<br>Disposition<br>Action |
|---|---|
| Cool Blast Mints | 1<br>19000-08880<br><br>Damage<br>Donate<br><u>Delete</u> <u>Edit</u> |
| Expo Dry Erase Marker Set | 2<br>19001-09983<br><br>Recall<br>HFV<br><u>Delete</u> <u>Edit</u> |
| Ice Breakers Mints | 3<br>23000-76234<br><br>Damage<br>Destroy<br><u>Delete</u> <u>Edit</u> |
| | 4 |

| Visit Questions | UPC Lookup | Change Mode | Finish |

*FIG. 9*

METHOD AND PROGRAM FOR REDUCTION OF RETAIL SALES REVENUE LIMITATIONS

TECHNICAL FIELD OF THE INVENTION

A method for increasing revenue and profits associated with a retail sales operation through the improved tracking of product inventory.

BACKGROUND OF THE INVENTION

Under a purely economic driven model, all sales operations seek to maximize profits. Many activities occurring in the normal stream of commerce can reduce profit margins or prevent increases in revenue. These activities are collectively referred to as revenue limitations, and these limitations are also called "shrink" because they shrink revenues or profit.

Revenue limitations, or shrink, can result from product loss, spoilage, obsolescence, expiration, recall, theft, fraud, damage, and destruction. All of these types of activities shrink profits and revenues in any sales operation, and revenue limitations impact profits at all levels of retail operations. Manufacturers, distributors, wholesalers, and retailers share many of these business losses.

Most of these limitations are viewed as unavoidable because implementing sufficient managerial oversight to reduce shrinkage is impractical or not cost effective. That is, the projected costs associated with reducing this shrink (or loss) outweigh the expected benefits. In 2002, revenue limitations (or shrink) accounted for $31 billion in lost revenue in the United States retail industry. Accordingly, even a modest reduction in revenue shrinkage could offer a significant increase in profitability.

As an example of shrinkage, a particular retail product may be discontinued because of the new introduction of a replacement product. Under most present practices at a retail location, the discontinued product would simply be discarded even though the product is in a good condition for sale. Discarding such a discontinued product is considered a loss for accounting purposes. However, if the discontinued product were instead donated to a charity, it could be accounted for as a tax-deductible donation offsetting the loss in retail sale of the discontinued product. Or, the product might still be marketable at another retail operation specializing in the sale of discontinued items. In that later circumstance, the discontinued product may be sold to the "seconds" store for some profit realization (over the Internet on a website). Without adequate management and direction over the disposition decision, however, many businesses simply choose the simplest manner of handling such discontinued product—that is, by putting it in a trash dumpster. As such, what is needed is an improved system for tracking product inventory, identifying alternate dispositions for inventory, and providing direction on the disposition of certain product inventory.

Bar codes were originally developed in the 1950s, and bar codes are currently used as an increasingly important source of data acquisition in the retail industry. Virtually every retail operation utilizes some form of bar coding, and bar coding is emerging as a viable means for identifying and tracking product from point of manufacture to point of sale. Bar codes, however, are not known to be used to account for product items disposed by a retail operation in the situation of a discontinued product, obsolete product, or out-dated product.

A number of bar code options are available. The most prevalent bar code standard remains one-dimensional bar code symbologies. One-dimensional bar coding is well established, but it suffers from a limited data capacity of approximately 50 characters. A more advanced option is two-dimensional (2D) bar code symbology that includes stacked and matrix codes. Stacked codes feature a linear bar code with a capacity of approximately 2000 characters. Matrix coding uses patterns of cells of varying shapes offering higher data density to that of stacked codes but remains approximately a 2000 character maximum capacity. A newly emerging class of coding, composite codes, features both linear bar and matrix symbol coding and is very useful where different parts of the information may be required at different points in the product's life. Composite codes feature both a linear symbol code (e.g. a stacked code) and a matrix symbol code that packs in more encoded data, such as batch or lot identifiers and manufacturing dates.

An emerging technology that may replace bar codes is radio frequency identification tagging (RFID). Similar to anti-theft tags, RFID works using a small chip broadcasting a radio frequency signal in response to a query signal from a data collection device. While still cost prohibitive, RFIDs may emerge as a new source of data acquisition for information currently found on products in bar code format.

The most overriding weakness regarding control of shrinkage is a lack of management control. There are few, if any, management mechanisms that support tracking and control of product loss, spillage, fraud, obsolescence, destruction, and damage. While theft is one revenue limitation that the retail industry attempts to track and control, other areas of revenue limitations (or shrink) have historically seen little specific attention for tracking and management. Effective management control for destroyed, discontinued, recalled, or expired product is needed. An efficient, economical management tool for monitoring, tracking, and controlling retail product from point of manufacturing and distribution to the retail store level would solve this outstanding need, thereby increasing revenue or profit of retail operations.

SUMMARY OF THE INVENTION

The invention is an improved method for tracking product inventory to manage and account for product loss, spoilage, obsolescence, theft, recall, destruction, or damaged product. The goal of the invention is collection of data at store-level. By increasing management and accounting of unsold product items, revenues and profits will increase and revenue limitations, or shrink, will decrease for a retail operation.

The invention includes a hand-held data collection device for collecting product information, inventory data, client identification data, store data, and location data. A computer database manages the collected data, stores the data, and tracks permissible disposition of unsold product on behalf of a client retail operation or manufacturer. The retail operation and the manufacturer can also manage product donations, resale of "seconds," and also account for spoiled, damaged, destroyed, recalled, or returned product.

A data collection device can collect data on product inventory and obtain disposition instructions for product items. Disposition instructions can include return to the manufacturer, vendor, or wholesaler, donation to charity, or shipping for resale, repair, modification, or refurbishment. The retail operation and/or manufacturer can access the product inventory database to update or access information on product inventory and disposition. At the end of a visit, a credit memo report of the data collected is left with the store to use for a cash credit or cash redemption. The invention will improve management control over unsold product inventory so that shrink can be efficiently reduced.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 4 is a first embodiment for a data collection device;

FIG. 5 is a second embodiment for a data collection device;

FIG. 9 is an embodiment of the display on the screen device set to Return Mode product processing.

DETAILED DESCRIPTION OF THE PREFERRED EMBODIMENTS

Figure 1:
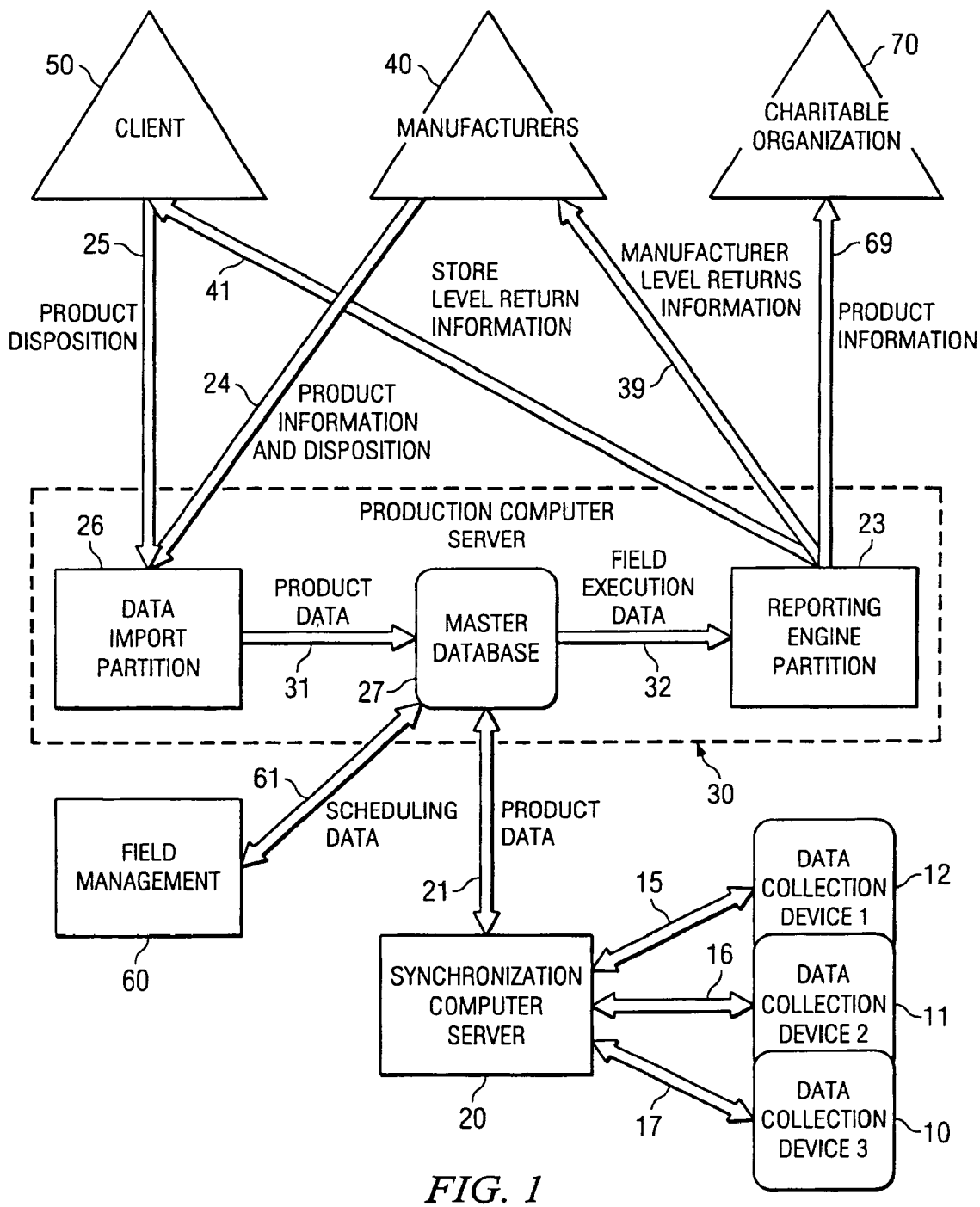
FIG. 1 shows the basic functional components and entities of the invention and the communication links between the components and entities.

FIG. 1 shows the basic functional components and entities in the invention and the communication links between those entities. The invention has a master database 27 in a production computer server 30. The computer server 30 also executes applicable programs and routines to support, maintain, and operate the master database 27. Communication systems are also available to access and utilize that master database. The invention also has a plurality of data collection devices, represented by data collection device 10, data collection device 11, and data collection device 12.

Each of the data collection devices 10, 11, and 12 transmits product information and receives product disposition information over a communication link to a synchronization computer server 20. For example, data collection device 10 is linked to the synchronization computer server 20 by communication link 17, data collection device 111 is linked to the synchronization computer server 20 by communication link 16, and data collection device 12 is linked to the synchronization computer server 20 by communication link 15. These communication links 15, 16, and 17 may be over the telephone, computer Internet connection, or a wireless signal.

The synchronization computer server 20 is linked to the master database 27 stored on a production computer server 30 by communication link 21. The synchronization computer server 20 processes and regulates input data from the data collection devices 10, 11, and 12 to transmit to the production computer server 30 using communication link 21. The production computer server 30 has three main parts: (1) the master database 27, (2) the data import partition 26, and (3) the reporting engine partition 28.

The master database 27 is linked to the data import partition 26 by communication link 31 and to the reporting engine partition 28 by communication link 32. The data import partition 26 processes data elements transmitted from clients 50 and manufacturers 40 to store and update associated data elements on the master database 27. Data elements can include disposition instructions, information on product items, special processing instructions, store information, inventory data, and other information pertaining to specified product items or contained in the master database 27.

Product information furnished by the data collection devices 10, 11, and 12 is stored in the master database 27 (or processed in the production computer server 30) for routing to the reporting engine partition 28 using communication link 32. Processed data from the master database 27 includes various generated reports and other transmitted information. Donated product item information and reports for a charitable organization 70 are transmitted to the charitable organization 70 using communication link 69. Such charitable communication can include product items requiring pickup. Manufacturer level product item information and generated reports are transmitted to the manufacturers 40 using communication link 39. Manufacturer communication can include return and/or shipping information. Client level product item information and generated reports are transmitted to the client 50 using communication link 41. Client communication can include the information on product inventory processed and actual implemented disposition including amount of product item and shipping destination.

The manufacturers 40 can update the master database 27 using communication link 24 to send updated information to the data import partition 26. The updated information from the manufacturer can include product item information, product disposition instructions, and other data elements. The client 50 can update the information on the master database 27 using communication link 25 to the data import partition 26 to send product item and store information. The data import partition 26 processes information transmitted from the client 50 and manufacturers 40 before updating the master database 27. The data import partition 26 also provides network security and authorization, so that only authorized persons can gain access to the system and master database 27.

In basic operation, the invention stores relational data on numerous product items covering one or more client's retail or other sales operations on the master database 27. A management interface with the master database 27 permits importing and manipulating data (through the data import partition 26) for storage in the master database 27 by the system operator or user and client 50 or manufacturer 40. The data includes information relating to products, locations, field representatives, and data collection parameters. The synchronization computer server 20 synchronizes data input from a number of data collection devices (e.g. data collection devices 10, 11, and 12) for transmission and integration/storage in the master database 27. The master database 27 initial configuration and setup with pertinent data is done by the user (e.g. the system operator) either using a direct input to the master database 27 or indirect input to the data import partition 26.

A field representative uses a data collection device (e.g. data collection device 10, 11, or 12) to input product item information and other data elements into the master database 27. The field representative can also retrieve disposition instructions for specified processed product items, as decided and directed by the client 50 and/or manufacturers 40. The data collection devices 10, 11, and 12 connect to the synchronization computer server 20 for data input and retrieval from the master database 27, preferably using an integral wireless telecommunication protocol, such as the Internet and/or cellular communication.

The field management entity 60 schedules in-store visits by field representatives and is connected to the master database 27 by communication link 61. The field management entity 60 preferably takes the form of a company administrator and dispatch operation, but it can include an automatic dispatch action communicated to an independent contractor. The field management entity 60 uses scheduling parameters in the master database 27 to schedule visits at client stores.

Figure 2:
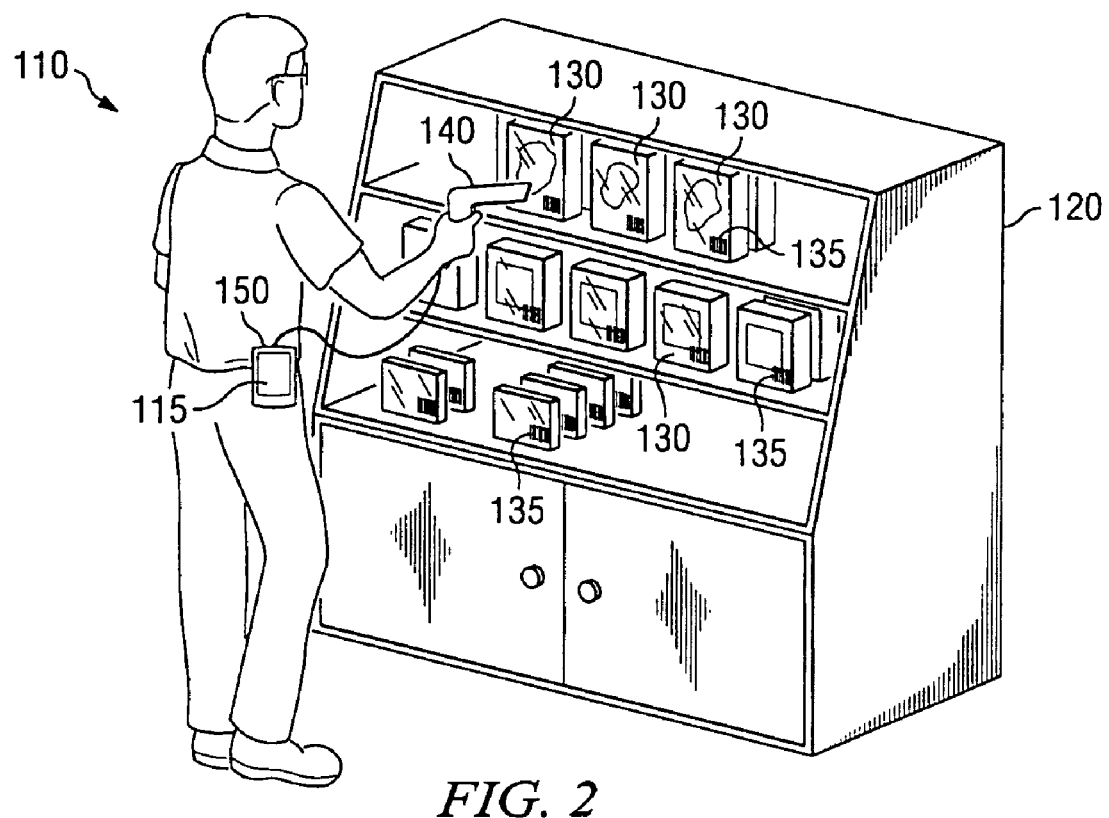
FIG. 2 shows a field representative performing a store visit.

Referring to FIG. 2, a field representative 110 inventories a display case 120 in a client store containing product items 130. The field representative uses a scanning device 140 to scans bar codes found on the product items 130 in the display case 120. The scanning device 140 is connected to a pocket computer (PC) 150 mounted on the field representative's belt 115. The scanning device 140 and the PC 150 collectively are referred to as a data collection device.

A field representative visiting a client store scans or manually inputs product item information into the PC 150. The scanned information uniquely identifies the product item and is used to associate other data elements with the specific product item. Disposition instructions for the specified product item stored on the master database 27 are also retrieved and displayed for implementation at the store by the field representative.

Figure 3:
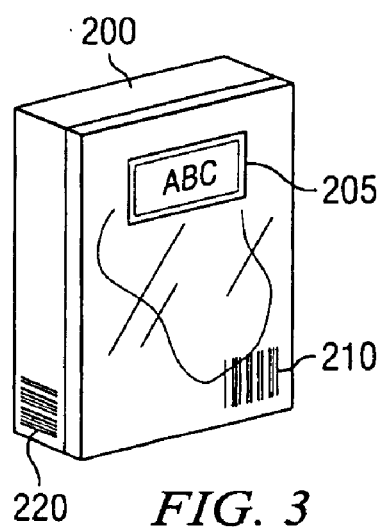
FIG. 3 is a view of a product item.

FIG. 3 shows an enlarged view of the product item 130. The product item is a box or other packaging body 200 enclosing the actual product. Typically, the packaging body 200 prominently features a product logo 205 and/or other marketing information in a colorful marketing format that includes the product name (e.g. ABC). The packaging body 200 typically has a bar code 210 on the front and/or a bar code 220 on the side of the product packaging body 200.

Bar code 210 or 220 is scanned by the scanning device 140, preferably a laser bar code scanner connected to or integral to PC 150, collectively referred to as a data collection device. The bar code 210 or 220 contains product item information the PC 150 processes to uniquely identify the product item. Commonly, the bar code 210 or 220 includes a universal product code (UPC), which is assigned to manufacturers to affix to specific product items. Most retail items are stamped with this unique UPC. Other data may also be included in the affixed bar code, such as a batch identifier, manufacturing date, expiration date, packaging data, hazardous material class (if applicable), and manufacturing plant identifier. Some other FIG. 4 shows one embodiment for a data collection device. A PC 310 is connected by a flexible cable 320 to a hand-held bar code scanner 330 (preferably a laser scanner). The PC 310 includes an internal memory and a touch sensitive display screen 315 for direct data input into the PC 310. Preferably, PC 310 incorporates wireless communication capabilities for communicating with the master database 27. Examples of currently available PCs meeting these criteria include the Hewlett-Packard iPAQ series (h3900 and h5450), Sony Cile series (SJ30 and SJ 20), Toshiba e330, Toshiba e740, Palm Tungsten, Palm Pilot series (m515 and i705), and Dell Axim X5. Product item information is input into the PC 310 using either the bar code scanner 330 or the touch sensitive display screen 315 for updating the master database 27 and retrieving applicable disposition instructions.

Another embodiment for an acceptable data collection device is shown in FIG. 5. This embodiment includes a PC 410 featuring an internal memory, a touch sensitive display screen 415 for direct data input, an integrated bar code scanner 430 (preferably a laser scanner), and integrated wireless communication capabilities. Examples of currently available PCs meeting these criteria include the Symbol Technologies PDT 8000 and PPT 2800 and the Intermec 700. Product item information is input into the PC 410 using either the integral bar code scanner 430 or the touch sensitive display screen 415 for updating the master database 27 and retrieving applicable disposition instructions. Either of these two basic types of PCs 310 or 410 operates using a computer software program package executed on an internal central processing unit (CPU) to input and process product item data.

The field representative 110 scans bar code information with an integrated laser scanner 430 or attached laser scanner 330 into the PC 410 and PC 310. Although other types of bar code scanners are available, such as a wand or a charge couple device, these other types of scanners are limited in scanning range to contact or a couple of inches. Laser bar code scanners, in contrast, can read a bar code at distances from two to thirty feet away, and the laser type bar code scanner is the preferred embodiment for the bar code scanner in the invention. Additionally, the touch sensitive data input interface of the display screen on the PC 310 and PC 410 can be used to manually input product item information as an alternative to scanning bar codes for product items lacking bar codes or having unreadable bar codes.

The essential management tool of the invention is the master database 27 stored on the production computer server 30. The master database 27 is comprised of interlinked data tables and data elements. The client 50, manufacturers 40, field representative 110, and the system owner/operator have the ability of interfacing with various data tables, as permitted by the computer program, to input, manipulate, and modify data element entries. The master database 27 is used as a management tool to manage and track product item inventory at the retail store level. Table I identifies data table names, and a brief description for each one, of the various data tables included in the master database 27.

TABLE I

| TABLE NAME | DESCRIPTION |
| --- | --- |
| AGR | Client/Manufacturer Agreements |
| BIL | Client Billing Information |
| CHN | Client Chain Master |
| CLT | Client Master |
| CTG | Client-Item Categories |
| DIV | Client Divisions |
| DPT | Client Departments |
| DSP | Client-Item Dispositions |
| EVN | System Event Audit Log |
| INF | Invoice Number Format Rule |
| ITM | Client Items |
| JOB | System Job Type |
| MBR | Manufacturer Brand Names |
| MFG | Manufacturer Master |
| MIT | Manufacturer Items |
| MUR | Manufacturer UPC Ranges |
| NTF | Not-Found Scans |
| PGM | Client Program Type |
| PRD | Client Processing Periods |
| PRM | System Parameters |
| PZN | Store Price Zones |
| QST | Question Types |
| REP | System Representative |
| STT | Store Type |
| RTP | Return Type |
| SCE | Expanded Scans |
| SCR | Raw Scans From Store |

TABLE I-continued

| TABLE NAME | DESCRIPTION |
| --- | --- |
| STR | Client Stores |
| TAX | Tax Entities |
| USR | System Users |
| VMC | Vendor Miscellaneous Charge |
| VND | Vendors |
| VSC | Visit Schedule |
| VSM | Visit Summary |

The Client/Manufacturer Agreements (AGR) table indicates any agreement level between a client (e.g. retailer, distributor, wholesaler, etc.) and a manufacturer stated national billing policy and whether or not client information data is also transmitted to the manufacturer. Agreement levels are indicated by a level code, and each data element in the table reflects a client, a participating manufacturer, and the corresponding agreements between the client and the manufacturer.

Important data elements in this table can include an identifier for the client, an identifier for the manufacturer, and a data element for the level of agreement between the two entities. The level of agreement code can indicate: 1) the client does not wish to implement the national billing policy factors for a particular manufacturer, 2) the client agrees to use all applicable billing factors, 3) the client agrees to use only the billing factors supplied by the manufacturer for each item and that handling charges pertaining to each item will be sourced from the client's files, and 4) the client agrees to use only applicable item handling charges supplied by the manufacturer for each item, such that item billing cost for each item will be sourced from the client's files.

The Client Billing Information (BIL) table assists billing for clients, manufacturers, or other third-party entities if applicable. Invoices are generated as required based on captured services statistics. Important data elements found in this data table include a retail chain identifier, a client identifier, a manufacturer identifier, a data element indicating the amount payable, a period start date, and a period end date.

The Client Chain Master (CHN) data table contains data regarding each client entity (e.g. Albertsons, Wal-Mart, Kroger, Target, etc.). Information such as a client chain identifier, a type of business identifier, a main common business address, a contact name, and a contact phone number are included in this table. Updates are performed using a user interface with the master database 27 by the system owner/operator.

The Client Master (CLT) data table contains data elements regarding each client division entity (e.g. Albertson-Texas, Wal-Mart-Texas, Target-Tennessee, etc.). This data table defines the segregation of work performed according to divisions found in a client chain. These divisions are defined by the individual clients and specify how data will be collected and processed. Updates to this data table are performed using a user interface. Important data elements in this data table include a chain identifier, a client name or division identifier, address, and primary contact information.

The Client-Item Category (CTG) table contains data elements for optional codes used by a client to identify specific groupings of items. The codes establish multiple categorization schemes, in addition to a client-item department code. Updates to this data table and new category codes are performed using a user interface and by the client through a client data import function on the data import partition 26. Major data elements include a client identifier, a client-directed grouping of items, a description of the item category, and a cost/credit retail value used when calculating store credit for a specific processed item.

The Client Divisions (DIV) data table contains data elements regarding a client's geographical divisions or regions separately identified for reporting purposes. Updates to this data table are by a user interface. Important data elements include a data element identifier the client associates with the division, a name by which the division is identified by the client (e.g. Southern, Eastern, Southwest Texas, etc.), address information, and primary contact information.

The Client Department (DPT) table contains optional codes used by a client to identify the departments found within a store and to segregate product items by departments for reporting purposes. Updates to this data table are performed by a user interface and by the client through the client data import function on the data import partition 26. New department codes are also added to the table using the client data import function. Important data elements for this data table include a department identifier, a descriptive name for the department, the price basis used when calculating a store credit for product items in the department, and a data element specifying a percentage used when calculating store credit for a processed item.

The next data table, the Client-Item Disposition (DSP) data table, contains unique codes and descriptions of a client-defined strategy for disposing of product items. These particular code definitions can be unique for any given client. Examples of possible code definitions include "HOLD FOR VENDOR", "DONATE", "DESTROY", "SPECIAL HANDLING", or "UNAUTHORIZED". Data table updates and additions of new disposition codes are accomplished using a user interface and through a client data import function on the data import partition 26.

Important data elements for this table include the type of item disposition, a text description for the item disposition, a text description displayed on the data collection device, and a destination data element of the exact location that product is to be physically shipped or delivered for disposition. Possible disposition options include modification or refurbishment, destruction, sale through another retail operation, sale on the Internet, recall, recycling, return to vendor, donate to charity, or repackage. The destination data element can include ship to manufacturer, ship to a charity, ship to a different retail store, ship to a warehouse, ship to a landfill, ship to an incinerator, ship to a client facility, hold for vendor pickup, hold for charity pickup, or list for sale on an Internet website. These disposition or destination instructions are specified and defined by either a client or manufacturer.

The System Event Audit Log (EVN) data table captures information pertaining to significant events in the system. Data elements corresponding to program execution and duration, error notification, and column level changes are stored in this data table. Records are inserted in this table at the start and completion of all batch process functions. Any errors occurring within these functions are logged on the EVN table. Functions that modify system tables will record change information, the table name affected, the column name that changed, type of modification (e.g. insert, update, delete, etc.), old column values, and new column values. If more than one column is changed, multiple records will be inserted.

The Invoice Number Format Rule (INF) data table contains rules to determine the formatting of invoice numbers generated on behalf of a client, manufacturer, or, in some cases, charity. These rules can be identical or differ for any given entity.

The Client Items (ITM) data table represents a client's primary information about the items or products that may be processed within the client's stores. Important data elements found in this table include the Universal Product Code (UPC), item description, associated vendor identifier, manufacturer identifier, associated store department identifier, unit pricing and costs, product disposition, and various data flag indicators. Data flag indicators include whether the item is billable back to the vendor, whether the item is authorized for store processing and store credit, whether the item is a chain "private label" item, whether the item is governed by a "swell allowance" agreement, whether the item is hazardous, and whether the item has been discontinued. Updates to this data table are performed primarily through the client data import function on the data import partition 26. The UPC is usually included in the scannable bar code on the product packaging, and this code is a unique identifier for the product item used in the invention data processing and storing in the master database 27.

The System Job Type (JOB) data table contains information containing the various system executables and batch job functions that may be executed during the course of processing a client's data. This data table is used during the system audit process to determine when the job was executed, the success level, and by whom. The table also determines user accessibility. Updates to this table are performed by the user interface.

The Manufacturer Brand Names (MBR) data table contains codes used by a participating manufacturer to identify specific groupings of items into brands. For example, "Tide" is a brand of detergent owned by the manufacturer Proctor and Gamble, but "Tide" comes in many different packaging forms each with a different UPC code. A manufacturer may want specific treatment of these differing product items, such as different sorter methods, disposition modes, and reporting requirements. The brand categories for all participating manufacturers will be contained within this table with an identifier for the appropriate manufacturer. Updates for this table are performed by a manufacturer data import function on the data import partition 26 and by a user interface. Important data elements in this table include the Manufacturer Master (MFG) table identifier for the manufacturer owning a particular brand, an identifier for the brand, and descriptive information pertaining to the brand item name.

The Manufacturer Master (MFG) table contains data pertaining to all the participating manufacturers. A participating manufacturer is defined as a manufacturer participating in the operator's service, such as by providing weekly or monthly return files or data for all items in their product inventory. Updates on this data table are performed by a user interface. Important data elements include a unique identifier for the manufacturer, a name by which the manufacturer is known, address information for the manufacturer, primary contact information, and data flags. Data flags can include indicators for whether or not data is imported on a periodic basis and whether the manufacturer has a stated and national billing policy.

The Manufacturer Items (MIT) table represents all participating manufacturers' primary information about the various product items that may be processed from client's stores. Data such as UPC codes, item descriptions, unit pricing, brand information, product information, and product item dispositions are stored on this data table. Manufacturers primarily update this table using the manufacturer data import function on the data import partition 26 and by the user interface.

Important data items for this data table include a manufacturer master table identifier for the manufacturer associated item, the UPC code affixed on a product item's bar code, an item description, a new product identifier assigned by the manufacturer, the type of disposition chosen by the manufacturer for the product item, a category type identifier assigned to an item by a manufacturer identifying a grouping of similar items, a sale unit data element indicating the quantity or count for the UPCs that makes up the "unit" (e.g. six pack of soft drinks would have a selling unit code of six).

Other data elements include bill costs, which is the actual cost associated with a vendor invoice, and the direct product code cost associated with moving an item from the manufacturer or distributor to the client store. This cost item can be recouped from a vendor at the time of invoicing because of damage. Another important data element is a handling charge data element that provides an amount that a manufacturer agrees to pay for the handling/processing of the item. Data flags may also be included which would indicate whether or not an item is billable back to a vendor, whether or not the item is a chain "private label" item, whether the item is governed by a "swell allowance" agreement, and whether or not a particular item is considered hazardous.

The Manufacturer UPC Ranges (MUR) table defines UPC codes within a range that belongs to a specific manufacturer. This information is used as a reference for determining which manufacturer to whom a particular product belongs. The UPCs within the range must be continuous, with no other item belonging to another manufacturer assigned a UPC within that specified range. A user interface updates this table. Important data elements in this table include a manufacturer identification element, the beginning UPC in a range, and the ending UPC in a range.

The Not Found Items Scanned (NTF) table contains scanned item information captured at the store level that cannot be matched to an existing row in the Item (ITM) table. This data, along with other scans, is selected by a systems representative then transmitted to the data synchronization computer server 20. An inbound scanned items function will identify all scans not matching a record in the ITM table, and then insert those unmatched data scan records into this NTF table. This information can provide a basis for generating not-found scanned reports and/or files back to the client. Important data elements in this table include a client identifier, return mode under which this product was processed, the UPC of the item processed, and the store identification where the product item was processed.

The Client Programs (PGM) table contains data that defines the types of programs or return modes that can be executed. Examples include "DAMAGE", "RECALL", "RESET", "OUT OF CODE", and "DISCONTINUE". Programs, such as Recalls, may be subcategorized by a control number, allowing for definition of many Recalls within the overall Recall program type. Updates are performed by the user interface and by the client data import function.

Important data elements found in this table include a unique identifier assigned by the client identifying the program, a program identifier, a program description, a vendor identifier associated with the program (primarily applicable for Recalls or Resets), a client item disposition identifier used primarily for non-damage programs, a return authorization code, and a handling charge identifier for the value that the retail client charges a vendor for the handling of all products under the program.

The Client Processing Periods (PRD) data table contains information pertaining to each client processing period or cycle. Data such as period number, start and end date, and invoice dates are contained within this table. Updates are performed by a user interface prior to the actual processing period in effect.

The Processing Parameters (PRM) data table contains various parameters at various levels needed for system processing. Typically, these values are established during system implementation and change infrequently. Parameters may be referenced throughout any phase of a client's processing (e.g. data import from client, product item scanning, data export to client, etc.). Updates are performed by a user interface. Important data elements in this table include a program identifier that indicates the program to which this parameter applies, a unique identifier for the parameter type, a text description for the parameter, and a value for the parameter.

The Store Prices Zones (PZN) data table contains store price zone designators for client stores. A client store may be categorized within a certain price zone to be used for item pricing. If so, any item processed within a store would use the store's price zone designation to look up the correct item pricing. Zone pricing is a function of the item retail cost, not the billing or credit cost values. Updates and new price zone designations are performed by the user interface and the client data import function. Important data elements for this table include a store price zone identifier and a text description of the price zone.

The Question Types (QST) table contains all questions requiring a response that may be presented to a field representative during the course of processing a product item. These questions and response are typically performed at the request of the vendor and may be done for an individual item or all items. Updates are performed using the user interface. Important data items for this table include a question type identifier, text displayed to the user for this question type, and the response type to that item which can include, as examples, yes/no, numeric, date, or text. Other important data elements can include an effective date for the question and an end date for the question.

The next table is the Systems Representative (REP) table, which contains information relating to all current system field representative employees. Updates are performed using the user interface. This data must be created before a field representative can begin processing product at a store location. Important data elements for this table include an identifying number assigned to the employee, the name of the employee, the employee's security level, a password used by the employee to verify identity and log on to the system, a language preference for the employee, a job title for the employee, a hire date for the employee, contact information for the employee including telephone number and address, an identifier for the employee's work location, and an identifier for any remote hand-held data collection device assigned to the employee.

The Store Type (STT) data table contains codes and descriptions of the various categories of stores. Examples can include department, grocery, drug, hardware, book, etc. Each entry in the CHN file will be designated for one of these categories. This information can be used for internal reporting for the purpose of categorizing and collecting data regarding the various client store types. Important data elements for this data table include an identifier of the type of business performed and a description for that type of business.

The Return Type (RTP) data table contains code and descriptive information pertaining to the various return types, or modes, that a client specifies for identified product items. Examples include "DAMAGE", "RECALL", "RESET", "OUT OF CODE", and "DISCONTINUE". Important data elements included in this table may include an alphanumeric code to identify the return type, a description of the return type, a data flag indicator indicating whether or not handling charges are to be applied to a vendor for that type of return, a data flag indicating whether or not outbound files are to be created for the retail client showing this return, and a data flag showing whether or not outbound files will be created for the manufacturers for this return or type item.

The Expanded Scanned (SCE) data table contains the "expanded" scanned records. The expansion process takes place after an inbound scanned extract function has been completed and before the processed output is generated. This table will serve as the basis for the final output reports generated for retail clients and manufacturers. The Raw Scan (SCR) table for the current processing period is read and additional information pertaining to these scanned records is attached creating the expanded scan record (SCE) data table. The purpose of the information captured is to "snapshot" the data as it was at the time processing began. This is important for historical reporting. The expanded records may be grouped by: 1) program control identifier, 2) UPC, 3) store identifier, 4) scan date, 5) disposition container identifier, 6) field representative identifier, and 7) question response. Updates are performed by a scan expansion function.

Specific data elements in the SCE table may include a control number associated with this specific client program, a unique identifier assigned to the client, a store identifier, a store division identifier, the UPC of the item, an item description, an in-house identifier assigned by a client, scan date, total quantity of product processed, vendor identifier, the department associated with the item, a client grouping identifier, a manufactured defined grouping of items, a manufacturing brand identifier, a disposition code for the item, a representative identifier, a disposition container identifier, the unit cost of the item specified by the client to be used as the actual cost associated with a vendor invoice, a unit cost of the item specified by the client, a unit retail value for the item specified by the client, a unit cost of the item specified by the manufacturer, a percentage used for calculating the amount of store credit to be received for an item, a vendor handling charge, and the level of the agreement between the client and manufacturer pertaining to vendor billing.

Data flags are also present indicating whether or not the item is billable back to the vendor, whether the item is authorized for processing in the store and eligible for a store credit, whether the item is a chain "private label" item, whether or not the item is governed by a "swell allowance" agreement, whether or not the item is considered hazardous, whether or not the item has been discontinued for sale by the client, and whether or not the item must have a tax value applied at the cost for government reporting purposes. Other data items can include return authorization codes that govern and specify authorization to return or process the item.

The Raw Scans From Store (SCR) data table contains the scan information captured at the store level by a field representative. The field representative using the data collection device collects this information, which is then transmitted to the data synchronization server 20. This information is accumulated and processed on the data synchronization server 20 and transmitted to the production computer server 30 for processing and integration into the master database 27.

Important data items in this table include a client identifier, a client return type identifying the return mode and type in which this product was processed, an item identifier for the item processed, a client store identifier, a date and time when the item was scanned or processed, the UPC of the item processed, the total quantity of the item processed, a disposition code showing actual disposition of the product that was performed at the store, a container identifier for the container in which the item was placed for disposition, the field representative response to any question, and an identifier for the field representative processing the item.

The Client Stores (STR) data table contains information for each of the client store locations. Updates are performed using the client data import function and the user interface. Important data elements that may be found in this data table include a client division identifier indicating which division the store is associated, a pricing zone identifier identifying which price zone the store is associated, the tax entity identifier for the tax zone activity the store is associated, a code identifier for the store, the name of the store, the address of the store, the name of the store manager, contact information for the manager, a data element indicating the price basis to be used when calculating store credits for authorized items within the store, and the percentage of the item retail cost used for calculating store credit for authorized dispositions within the store.

The Tax Entity (TAX) data table defines a tax zone, or entity, used when assessing the need to apply tax surcharge to certain items processed in a store. One example would be tobacco items, which are required within certain geographical areas to apply a tax for handling. All client stores will have a designated tax zone. Updates are performed by the user interface and also by the client data import process.

Data elements can include an identifier for the tax entity assigned by the client, a name or description for the tax entity, a surcharge amount that the retail client will apply to the cost of an item for the handling of all designated category products within the tax entity, and a surcharge percent of the item bill cost the client will apply to the item cost for the handling of all designated category products within the tax entity.

The Systems User (USR) data table contains information relating to all the system user employees. Updates are performed by a user interface, and this data must be created before a user can begin performing any system functions. Important data elements that may be found in this table include an employee number assigned by the company, the name of the employee, the security level assigned to the employee, a password used to verify the employee's identity and ability to log onto the system, a language preference for the employee, job title held by the employee, hire date for the employee, and contact information for the employee.

The Vendor Miscellaneous Charge (VMC) data table contains data for one-time or ongoing charges and/or credits to be applied to the vendor invoice. These charges and credits are flat dollar amounts to be added or subtracted to the accumulated invoice total. Examples include freight charges, handling charges for hazardous materials, storage fees, and off-invoice credits. Updates are performed by a user interface and through the client data import function.

Important data elements for this table include a vendor identifier, the actual dollar amount of the charge/credit, a description of the charge/credit, an indicator showing whether or not this is a credit or subtraction from the invoice total, a data flag indicating whether or not the charge is to be applied to all invoices or just for a particular vendor, the effective date on which the charge/credit becomes effective, the date on which the charge/credit is no longer effective, and the date that this charge/credit was last applied on the vendor's invoice.

The Vendors (VND) table contains information pertaining to all vendors doing business with a client. Data such as a vendor identifier, vendor name, vendor address, and billing information are found in this table. Updates are performed using the user interface or possibly by vendors using a vendor import function on the data import partition 26.

The Visit Schedule (VSC) data table contains information pertaining to in-store visits scheduled for field representatives. The VSC table sets the locations and sequence for stores that the field representative will visit. Updates are performed by a user interface from a scheduling coordinator or function on the production computer server 30. Important data elements include a client identifier, a client store identifier, a primary field representative identifier, an alternate field representative identifier acting as a back-up for the primary, the scheduled begin date, the scheduled completion date, a numeric sequence for the visit, and any miscellaneous comments or notifications to the field representative pertaining to the visit. This comment data can include special scanning or disposition instructions, code types to be processed, or other special procedures that need to be followed.

A Visit Summary (VSM) data table contains data related to each in-store visit completed by a field representative. Important data information in this data table includes an identifier for the scheduled visit, a field representative identifier, the date and time of the first scan for the visit, the date and time of the last scan for the visit, a unique identifier for the data collection device used, the date and time the store manager signed off on the visit, the date and time that the product's detail report was generated as a leave behind for the store, the date and time that the visit detail information completed transmission to the synchronization computer server 20, and miscellaneous comments from the field representative pertaining to the visit.

Figure 6:
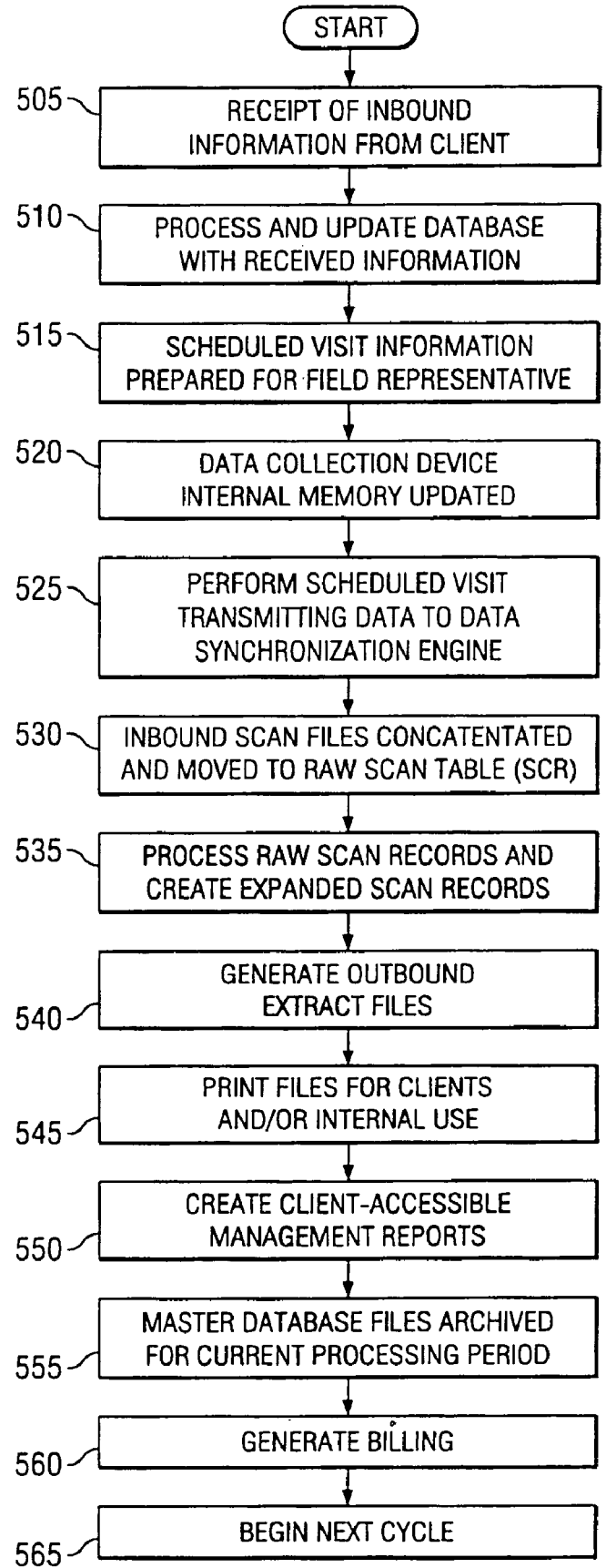
FIG. 6 is schematic showing the basic steps of the method followed in the invention.

FIG. 6 is a process flow chart for the procedures of this method using the master database 27. The method focuses on a continuing series of processing cycles for each client. The cycle period is specified by each client and could be anywhere from a daily to a monthly period. During this period, certain data or information inputs and outputs are exchanged between the system operator, the client, participating manufacturers, and any other third-party organizations (e.g. charities).

The processing cycle starts at the first step 505 with updating the master database 27 with received information from the client 50 or manufacturers 40. In step 505, inbound item information is received at the data import partition 26 on the production computer server 30. Inbound information includes inbound product item information, inbound vendor information, inbound store information, and inbound program control information. Information received at the data import partition 26 comes from manufacturers 40 and clients 50, and possibly vendors. This information is received between one week and one day prior to a scheduled in-store visit.

In step 510, the received inbound information data is processed and used to update appropriate data tables on the master database 27. An import process or function is executed to process inbound information received at the data import partition 26, update the master database 27, and generate exception reports. After updating the appropriate master database 27 files, the inbound information files are copied to an archive directory in the data import partition 26 before the inbound receipt directory is cleared.

In the next step 515, scheduled visit information is prepared for the field representative. Information is segregated for each field representative by visit sequence, date, store name and address, and visit instructions that are transmitted to the field management entity 60.

In step 520, the internal memory in the individual data collection devices assigned to a field representative is updated. Visit schedule, product item, vendor, store, and program control information are transmitted to the data collection device for storage in the internal memory in preparation for in-store processing. At this point, a freeze on all inbound file extracts applied to the master database 27 is implemented until the next processing cycle begins. Product item and program control information can be transmitted to the data collection device during the in-store visit or before the visit and stored in the internal memory.

The field representative performs the scheduled visit transmitting inbound scan file data to the data synchronization engine function on the synchronization computer server 20 in step 525. Using information transmitted from the master database 27 to the data collection device, the field representative scans the appropriate items as directed by instructions displayed on the data collection device. The data synchronization engine on the synchronization computer server 20 validates the received inbound scan files for completeness and generates exception reports as required for transmission to the master database 27. The files are also checked against the Visit Schedule (VSC) table in the master database 27 to ensure all scheduled files have been received.

In step 530, the inbound scan files are concatenated and moved to the Raw Scan (SCR) table in the master database 27. The individual inbound scan files are then archived and the inbound scan file directories cleared for the next cycle. In step 535, these Raw Scan From Store (SCR) file records are processed to create expanded scan records in the Expanded Scan (SCE) table on the master database 27. The purpose of the SCE files is to save a "snap-shot" of the currently known database information, preserve that data for historical purposes, and generate required output files and reports. All required output files and reports are generated from the files in the SCE table on the master database 27.

At step 540, the various outbound extract files are generated for each client 50, participating manufacturers 40, or charitable organization 70 as required. Standard outbound extract files include Client Invoice Summary, Client Store Credit Summary, Client Processed Items Detail, and Not-Found Items Detail for Client generated and transmitted to the client 50. Manufacturer Returns outbound extract files are generated and transmitted to participating manufacturers 40. A Charitable Organization Inbound Detail outbound extract file is also generated and transmitted to any applicable charitable organizations 70 as required.

In step 545, any required paper copies of files or reports for clients and/or internal use are generated and printed. Possible examples of printed reports include Client Invoices, Client Store Credits, Client Management reports, and internal activity logs. In step 550, various management reports are posted to client-accessible locations on the production computer server 30. Examples include an accessible link to the master database 27, a link to the reporting engine partition 28, or a secured website on a separate computer server interface linked to the production computer server 30. Alternative reporting methods include a database file transmitted to the client, a compact disc provided to the client, or a printed report.

In step 555, the master database 27 files are archived for the current processing period. An historical file of the master database 27 for each processing period is stored on the master database 27 and/or transferred to another memory storage medium, preferably a compact disc or magnetic data tape or disc. After archiving the data, the computer system performs file backups. At step 560, billing covering the services provided from the start of the processing period are generated and sent to the client 50, participating manufacturers 40, and/or charities 70 as required. At step 565, the next processing cycle is started.

Figure 7:
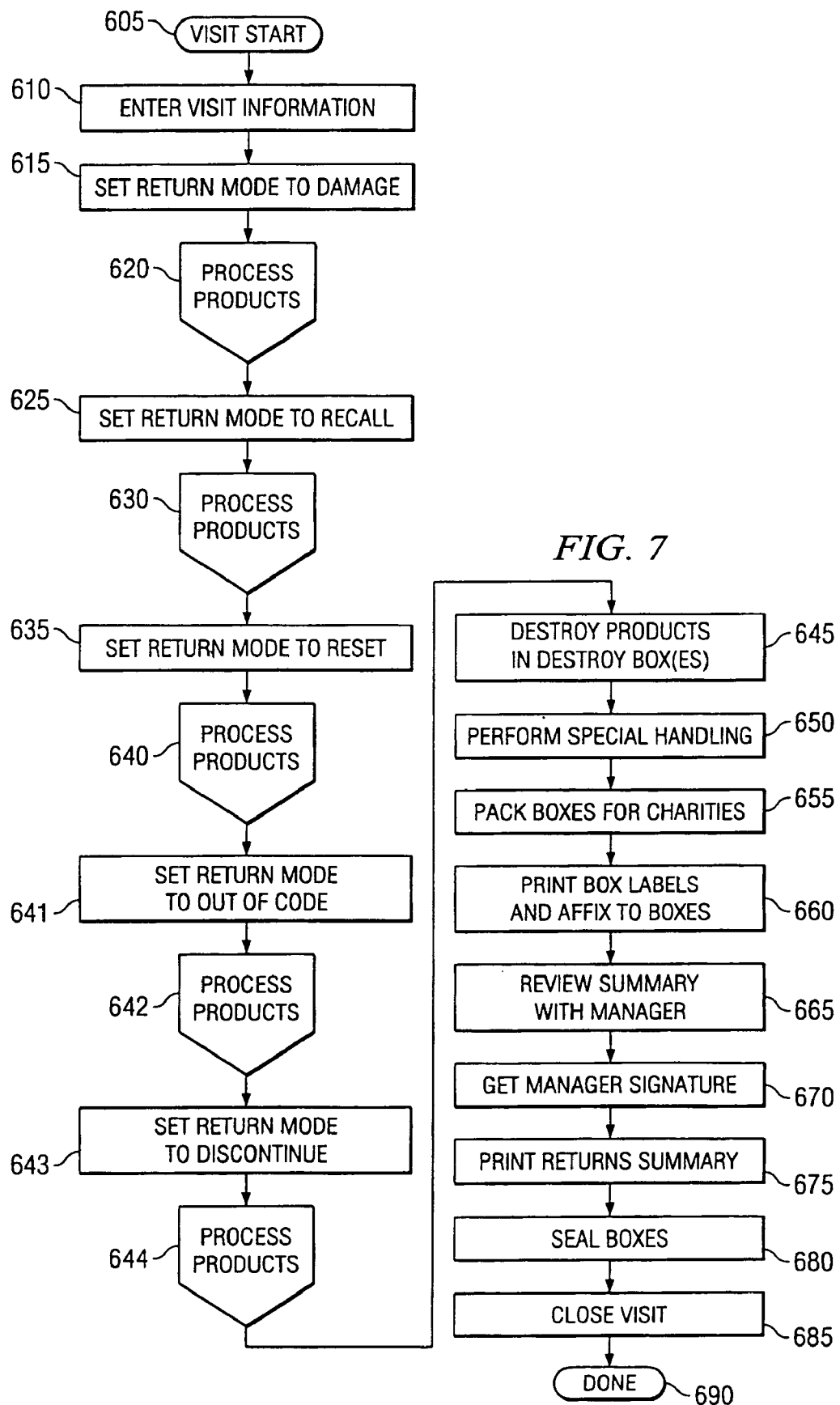
FIG. 7 is a flow chart showing the steps followed by a field representative during a scheduled visit.

FIG. 7 shows the procedure followed by the field representative during an in-store visit. The visit begins as step 605 with the field representative entering the scheduled store to perform a visit. In step 610, the field representative enters visit information into the data collection device. The data collection device will display a START VISIT screen displaying static information about the visit (Store Number, Store Name, Store Address, Client Name, Chain Name, etc) and initial questions to fill in using a data input interface (e.g. the touch sensitive display screen) into the data collection device. Questions can include date and time of visit start and any questions set by the client and/or the system administrator/operator. To proceed to the next step, the field representative selects a Return Processing mode for the data collection device, which will then display a RETURN PROCESSING screen.

In the next step 615, the field representative sets the Return Mode of the data collection device to DAMAGE, and the data collection device displays a user interface on the data collection device display. Following instructions displayed on this user interface in step 620, the field representative selects and processes damaged product items for disposition in the DAMAGE Return Mode. Processing can include bar code scanning and/or inputs using the touch sensitive display screen data input interface of the data collection device.

After completing processing with the Return Mode set for DAMAGE, in step 625 the field representative sets the Return Mode to RECALL. In step 630, the field representative using the data collection device set in RECALL Return Mode processes listed products. After completing processing with the Return Mode set for RECALL, the field representative sets the data collection device Return Mode for RESET in step 635. In step 640, the field representative uses the data collection device display in the RESET Return Mode to process listed products for specified disposition. After completing processing with the Return Mode set for RESET, the field representative sets the data collection device Return Mode for OUT OF CODE in step 641. In step 642, the field representative uses the data collection device display in the OUT OF CODE Return Mode to process listed products for specified disposition. After completing processing in the OUT OF CODE Return Mode, the field representative sets the data collection device Return Mode for DISCONTINUE in step 643. The field representative then uses the data collection device display in the DISCONTINUE Mode to process product in step 644. This completes product item scanning or data input into the data collection device.

In step 645, the field representative packs product items identified during processing for destruction in "Destroy" boxes and segregates those boxes. In step 650, the field representative packs product items identified for special handling in designated "Special Handling" boxes and segregates those designated special handling product items. In step 655, the field representative packs product items identified for donation in "Donate" boxes and segregates those donated product items. In step 660, the field representative prints box labels and address labels, as required, to affix to the boxes packed in steps 645, 650, and 655.

At step 665, the field representative meets with the store manager and reviews a generated summary report (the data for which is generated and stored in the master database 27 in the Visit Summary (VSM) table). The field representative reviews the summary data and, if appropriate, prints a paper copy for the store's records. In step 670, the field representative obtains the store manager's signature, which can be done using the touch sensitive data input interface on the data collection device or can be on a generated paper print-out from step 665. In step 675, the field representative prints a returns summary, detailing the contents of the boxes to provide to the store manager and/or other designated entities. This step may also include generating an inventory listing of each box. The returns summary can also be transmitted to appropriate entities from the reporting engine partition 28 using communication links 69, 39, and 41 as required to charitable organizations 70, manufacturers 40, and/or the client 50.

In step 685, the field representative closes the visit, performing any input entries or functions required to finish the visit such as transmitting data to the synchronization computer server 20, saving data on the data collection device, or contacting field management 60 by phone or using a communication interface to the synchronization computer server 20 through the production computer server 30. The field representative will also print a credit memo for cash credit or cash redemption (e.g. check). At step 690, the store visit concludes and the field representative departs the store.

Figure 8:
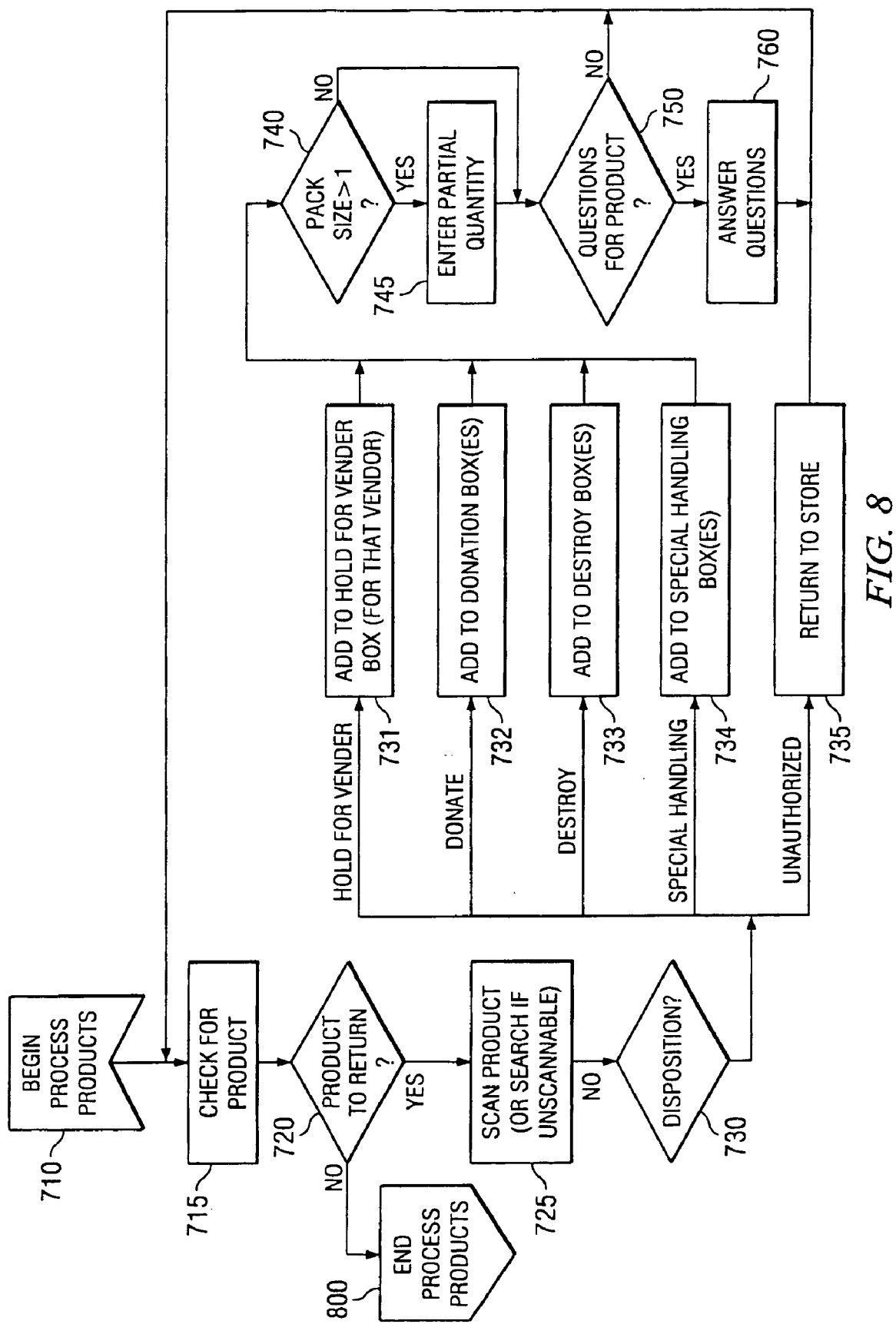
FIG. 8 is a flow chart showing the steps followed by a field representative to process product during a scheduled visit.

FIG. 8 shows expanded detail for the generic product processing steps 620, 630, and 640. At step 710, the field representative begins processing a product item by selecting a Return Mode for DAMAGE, RECALL, or RESET. This brings up a RETURN MODE display on the data collection device, an embodiment for which is shown in FIG. 9 where the Return Mode is set for DAMAGE.

In step 715, the field representative checks for product items to be processed in the selected mode. From the RETURN MODE screen, the field representative has seven options: 1) scan a product item for return, 2) manually perform a UPC Lookup a product for return, 3) change the Return Mode, 4) delete a product item return entry, 5) edit a product item return entry, and 6) answer visit questions.

If the field representative chooses to perform a UPC Lookup, he can perform the UPC Lookup using a text search or browsing by manufacturer, vendor, brand, or UPC. If performing a text search, the field representative completes one or more data fields such as UPC, product name, brand, or vendor on the data input interface of the data collection device and executes a query on the data collection device. The data collection device will attempt to find one or more matches for the data field inputs and list those matching products. If no match is found, the data collection device displays an error message, and acknowledging the error message will return the display to the UPC Lookup screen. If one or more product items are found and displayed, the field representative can choose one or more, or cancel back to the UPC Lookup screen. The field representative can also elect to cancel out of the UPC Lookup screen and return to the Return Processing screen.

When the field representative scans a product, or when a product is selected using UPC Lookup, the data collection device displays a Product Return screen showing disposition instructions for the product item at step 720. If there is no product matching the selected Return Mode, the display screen indicates that no product for that mode is being disposed and the field representative ends processing products for that mode at step 800 and proceeds to the next appropriate mode (e.g. RECALL or RESET).

If product items for the selected mode are found in the database in the internal memory of the data collection device, the field representative proceeds to step 725 where listed product items are scanned or, if a product item is not scannable, a search is performed, and applicable disposition instructions are displayed. At this step, the field representative has a set of boxes to fill with product items designated for "Hold for Vendor", "Donate", "Destroy", or "Special Handling".

In step 730, the data collection device displays the appropriate disposition for the product item as reflected in the internal memory database. For a product item designated "Hold for Vendor" the field representative will add the product item to a box designated and set aside for "Hold for Vendor" in step 731. If the product item is designated for "Donate", the field representative will add the product item to a box designated for "Donate" in step 732. If the product item is designated for "Destroy", the field representative will add the product to a box designated for "Destroy" in step 733. If the product is designated for "Special Handling", the field representative will add the product item to a box designated for "Special Handling" in step 734. If the product item is designated as "Unauthorized", there is no disposition instruction for that item and it is returned to the store display shelf for later sale in the store in step 735.

From step 735, the field representative will proceed to a new product item to check at step 715 and repeat the process. Proceeding from steps 731, 732, 733, and 734 to step 740, the field representative will consult the data collection device for a pack size designation and determination of pack size. If the pack size is not greater than one, then the field representative will proceed to step 750. If the pack size is less than one, then the field representative will enter the partial quantity into the data collection device at step 745 and then proceed to step 750.

In step 750, the data collection device will display any applicable questions regarding the product item. If a question is displayed, the field representative will answer the questions at step 760. If there is no question, the field representative will proceed to a new product item listing to check at step 715 and repeat the process. After answering the question at step 760, the field representative will also proceed to step 715 and repeat the process for a new product.

While the invention has been particularly shown and described with respect to preferred embodiments, it will be readily understood that minor changes in the details of the invention may be made without departing from the spirit of the invention. Having described the invention,

I claim:

1. A system for monitoring and managing unsold product inventory items comprising:
   a master database on a computer server storing data elements in data tables relating to the product inventory items at one or more retail sales operations;

a data collection device having an internal memory, a data input interface that includes a product code detection device and a manual data entry device, a display screen, and a communication link to the master database on the computer server, said product code detection device used in a retail store to detect product data from individual unsold inventory product items;

one or more data elements transmitted to the master database on the communication link to update a data element in a data table; and a disposition instruction for specified unsold product items transmitted to the data collection device on the communication link, said disposition instruction providing an instruction on the disposition of one or more specified unsold product items that is displayed on the display screen of the data collection device after receipt of product information by the data collection device while located within the retail store.

2. The system for monitoring and managing unsold product inventory items of claim 1 wherein the received data elements updating the master database are transmitted from a retailer.

3. The system for monitoring and managing unsold product inventory items of claim 1 wherein the received data elements updating the master database are transmitted from a manufacturer.

4. The system for monitoring and managing unsold product inventory items of claim 1 wherein data elements stored in the master database include a unique product item data.

5. The system for monitoring and managing unsold product inventory items of claim 1 wherein data from unsold inventory products items is scanned into the data collection using an optical scanner to collect coded data from a package label.

6. The system for monitoring and managing unsold product inventory items of claim 1 wherein data from unsold inventory products items is scanned into the data collection device using a radio frequency scanner to collect coded data from a package tag.

7. The system for monitoring and managing unsold product inventory items of claim 1 wherein the data from unsold inventory product items is entered into the data collection device using a touch responsive interface.

8. A method for implementing a disposition instruction for unsold product items remaining in inventory at a retail level store comprising the steps of:

providing a master database on a computer server that stores product information and disposition instructions for specified unsold product items in a retail store inventory;

collecting data elements from store inventory items at the retail store by a data collection device having a display, a data element scanning interface, a manual data input interface, a central processing unit, and a memory containing product item and program control information, said data elements are encoded on product item packaging and said data elements containing information associated with the product item;

displaying on the data collection device a listing of unsold product items specified to collect data from;

transmitting one or more data elements on product information to said computer server to update a data table in said master database with the one or more data elements including collected data from the unsold product items;

transmitting disposition instructions for at least one specified unsold product items from the computer server to the data collection device and displaying said instructions on the display; and implementing said disposition instructions for specified unsold product items at the retail level store after data collection and display of restrictions.

9. The method for implementing a disposition instruction for unsold product items remaining in inventory at a retail level store of claim 8 wherein disposition instructions include hold for vendor instructions.

10. The method for implementing a disposition instruction for unsold product items remaining in inventory at a retail level store of claim 8 wherein disposition instructions include donate instructions.

11. The method for implementing a disposition instruction for unsold product items remaining in inventory at a retail level store of claim 8 wherein disposition instructions include destroy instructions.

12. The method for implementing a disposition instruction for unsold product items remaining in inventory at a retail level store of claim 8 wherein disposition instructions include special handling instructions.

13. The method for implementing a disposition instruction for unsold product items remaining in inventory at a retail level store of claim 8 further comprising the step of transmitting one or more data elements on product information or program control information to the data collection device during an in-store review of specific unsold product items from the master database.

14. The method for implementing a disposition instruction for unsold product items remaining in inventory at a retail level store of claim 13 further comprising the step of transmitting one or more data elements on product information or program control information to the data collection device before an in-store review of specific unsold product items stored in the device memory from the master database.

15. A method for acquiring data and managing unsold product items in inventory at a retail level store comprising the steps of:

providing a master database on a computer server storing data elements associated with identified product items and including disposition instructions for specified unsold product items;

providing a data collection device having an internal memory, a data input interface that includes a data code scanning device and a manual data input device, a display screen, and a communication link to the master database on the computer server;

inputting one or more data elements from encoded data associated with the product item into the data collection device in a retail level store using said data input interface during an in store review of unsold product items, said review promoted by a computer coupled to the master database;

transmitting said one or more data elements from the data collection device to said computer server to update a data table in said master database; and displaying a disposition instruction for the specified unsold product item on the display screen of the data collection device for implementing at the retail store.

16. The method for acquiring data and managing product items in inventory at a retail level store of claim 15 further comprising the steps of:

inputting a unique product item data element for one or more specified product items into the data collection device by a field representative visiting said store; and transmitting one or more data elements associated with said unique product item data element to the computer server for storing in the master database and associated with the specific store inventory.

17. The method for acquiring data and managing product items in inventory at a retail level store of claim 16 wherein the data elements include a response to a question displayed on the data collection device.

18. The method for acquiring data and managing product items in inventory at a retail level store of claim 16 wherein the data elements include an identifier for the disposition implemented for the unsold product item.

19. The method for acquiring data and managing product items in inventory at a retail level store of claim 16 wherein the data elements include a shipping destination.

20. The method for acquiring data and managing product items in inventory at a retail level store of claim 15 further comprising the step of transmitting disposition instructions for one or more specified unsold product items to the data collection device during an in-store visit.

\* \* \* \* \*